April 22, 1924.

E. B. KILLEN

VEHICLE SUSPENSION

Filed April 2, 1920

1,491,482

Inventor
Edward Brice Killen,
By B. Singer, Atty.

Patented Apr. 22, 1924.

1,491,482

UNITED STATES PATENT OFFICE.

EDWARD BRICE KILLEN, OF LONDON, ENGLAND.

VEHICLE SUSPENSION.

Application filed April 2, 1920. Serial No. 370,778.

*To all whom it may concern:*

Be it known that I, EDWARD BRICE KILLEN, of 27 Queen Victoria Street, London, E. C. 4, England, have invented certain new and useful Improvements in Vehicle Suspension, of which the following is a specification.

My invention relates to the efficient springing of chassis and vehicles and is specially suitable for springing their front axles, which on most chassis are badly sprung at present, as compared with the back axles, and one object of the invention is to so spring the front axle of a chassis or vehicle that it is capable of passing more easily and smoothly over road inequalities or obstructions without the road shocks being transmitted as at present to the frame or body of the chassis or vehicle. In other words, by means of this invention the front axles are better suspended to absorb the road shocks, because the road obstructions are met at an extraordinarily favourable angle of wheel impact, when the chassis is moving in a forward direction.

In this invention, I prefer using laminated springs to the lower end of which the front axle is suitably attached, so that the front wheels when attached have a trailing effect instead of a pushing or thrusting effect when the chassis or vehicle is trailing in a forward direction.

This invention provides for great rise of wheels with an extraordinarily favourable angle of wheel impact, and an increasing stability as vertical force increases, and instead of road inequalities creating objectionable unbuffered thrusts and jars of considerable magnitude, tending sometimes to overturn existing chassis, this trailing suspension enables the wheels to ride smoothly and easily over practically all types of roads.

On existing chassis, I may lengthen the front part of the chassis frame so as to obtain an efficient length of laminated spring and trailing connection between the front wheels and the front part of the chassis frame to enable the front wheels to obtain an extraordinarily favourable angle of impact when meeting with the road obstructions and inequalities as the chassis moves in a forward direction; and it is to be noted that the lengthening of the front part of the chassis frame enables the chassis weight to be more equally distributed when required between the front and back axles than with many existing types of frames thereby enabling standardized tires which are attached to the back axle to be interchanged and used on the front axle, besides having other advantages.

When this invention is used the front wheels of a chassis or vehicle are capable of being as sensitively sprung as back wheels, whereas with existing method of springing, the front wheels are not so well sprung as the back wheels, and another advantage which this type of suspension has, is that it enables horizontal as well as vertical shocks to be efficiently absorbed when travelling forward at all speeds and on all roads.

With this invention, I preferably use a type of laminated spring which is sensitive under minimum load and which increases in effective strength with increase of load and becomes practically unbreakable under maximum load, having the spring controlled in its downward drop or movement below the chassis frame by a suitable check device which damps out the spring's objectionable periodicity as and when required, or I may use any suitable or efficient type of laminated spring which allows the front wheels of a chassis or vehicle to be sensitively attached and in effect trailed at an extraordinary favourable angle of wheel impact.

When building a new chassis I may construct the front part of its frame so as to allow the front wheels to be efficiently attached and in effect trailed by rigidly attaching the upper thick root end of the laminated spring direct to the chassis frame.

The mechanical attachment of the front wheels to the frame may be made in any suitable or well known manner, provided it allows the wheels to give much as and when required beneath the frame, and also allows horizontal as well as vertical shocks to be easily and quickly absorbed between the road and said frame, having the required lateral stability and there is no mechanical difficulty in efficiently attaching and mounting the front wheels sensitively when the front of the frame is lengthened, or the frame is specially constructed to take my type of trailing suspension.

Various forms of my invention are shown in the accompanying figures of which,

In all the figures the direction of forward movement is shown by an arrow and similar numerals refer to similar parts in all the figures.

Figure 1:
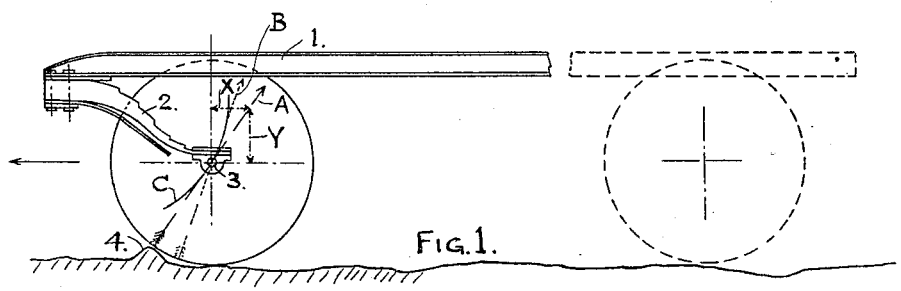
Figure 1 shows one form of my invention in which the spring is bolted to the chassis frame and to the front axle.

Referring to Figure 1, the frame of the chassis 1 at its extremity carries the laminated spring 2 which at its thinner or smaller end is attached to the axle 3 of the wheel, and by reason of the difference in level between the two extremities of the spring, the orbit of the axle in rising and falling is a curved path instead of the practically vertical one which occurs with the ordinary semi-elliptic or full elliptic type of spring, the latter types being generally mounted with their extremities at the same level and constraining the axle to lift (in relief of vertical shocks only) without absorbing horizontal shocks.

The effect of meeting an obstacle such as 4 is to create a thrust in the direction of the arrow A, the components of which are a horizontal force as represented by the line X and a vertical force as represented by the line Y.

As the obstacle is surmounted the force assumes a more vertical action and lesser horizontal action, as shown by the dotted arrow B. It will be observed that by reason of the curved orbit of the axle in rising (it is a portion of the curve shown by the full line C) the force is always more or less tangential to the curve of the orbit of the axle and therefore presents an extraordinarily favourable angle of wheel impact. It will also be observed that whilst the vertical component of the curve gives relief to, or in other words absorbs vertical shock to, the axle, the horizontal component of the curve gives relief against horizontal shock, whereby unbuffered thrusts and jars in both directions are eliminated.

Figure 2:
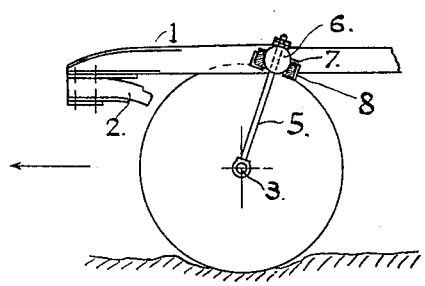
Figure 2 shows one form of check device for preventing objectionable periodicity.

Figure 2 shows a check device which limits the amount of separation between axle and chassis and prevents objectionable periodicity. There is no restriction to the life of the axle but upon undue separation taking place the rod 5 or its equivalent attached to the axle causes the ball 6 at its upper end to make contact with an annular rubber buffer 7 carried in a metal socket 8 suitably attached to the chassis.

Figure 3:
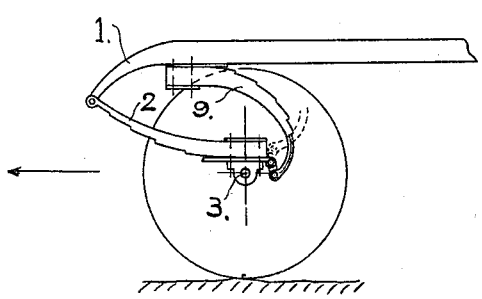
Figure 3 shows a modified form of my invention in which the spring is mounted on the axle and a secondary spring is used in conjunction with it.

In Figure 3 is shown the quarter elliptic spring 2 bolted to a spring table in the axle and attached at its thinner or smaller end to the chassis. This has the same trailing effect as above described, thus eliminating both vertical and horizontal shocks but in order to cause the spring to flex, without which it would afford no support to the chassis, a secondary spring 9 is attached to the chassis and at its lower end it is attached to the spring table or an accessory thereto, whereby the vertical posture of the axle is maintained unchanged as the axle rises or falls, an important factor in connection with the steering rods and appurtenances. The secondary spring may be attached by a link in tension as shown in full lines or by a link in compression as shown by the dotted lines, but preferably the former as it cannot overturn.

A secondary spring similar to 9 in Figure 3 may also be applied when required to Figure 1 to distribute the load over a wider area of the chassis frame.

By this invention the front springs of vehicles provide the same ease and facility of passage over uneven ground as the rear suspension does when provided with angularly inclined radius rods; in other words, horizontal shocks are absorbed as freely as vertical shocks adding thereby not only to the comfort of travelling but very materially to the life of the tires the chassis, and the propelling mechanism.

In this invention I preferably use a simple type of check device which allowing the axle or wheel perfect freedom in its upward movement or direction quickly brings to rest the laminated spring thereby damping out objectionable periodicity.

Claims:

1. In vehicle front-axle suspension, a chassis, an axle, a quarter elliptic spring having its front end attached to the chassis and the rear end attached directly to the axle, and a second quarter elliptic spring in rear of the first, arranged with its chord at an angle to that of the first and with its upper end attached to the chassis and its lower end connected to the axle, the front end of the chassis being lengthened to project forwardly over the front axle a distance at least equal to the length of the first named spring.

2. In vehicle front axle suspension, a chassis, a quarter elliptic spring having its front end attached to the chassis, an axle attached to the rear end of said spring, a second quarter elliptic spring arranged with its chord at an angle to that of the first named spring and having its upper end attached to the chassis, and a link pivotally connected to the axle and to the lower end of the second named spring, the front end of the chassis being lengthened to project forwardly over the front axle a distance at least equal to the length of the first named spring.

3. In a vehicle suspension, a chassis, a front axle, a quarter elliptic leaf spring having its thick end attached to the chassis and its thin end attached to the front axle, and a second quarter elliptic leaf spring arranged with its chord at an angle to that of the first named spring and having its thick end attached to the chassis and its thin end connected to said axle, the front end of the chassis being lengthened to project forwardly over the front axle a distance at least equal to the length of the first named spring.

In testimony whereof I affix my signature in presence of two witnesses.

EDWARD BRICE KILLEN.

Witnesses:
    OHM LIDDLE,
    JOHN TRAIN LIDDLE.